United States Patent [19]

Mizuno et al.

[11] 4,154,449
[45] May 15, 1979

[54] SEAL DEVICE FOR ROTARY HEAT-EXCHANGER

[75] Inventors: Toru Mizuno, Kariya; Masao Kitano, Numazu, both of Japan

[73] Assignees: Nippondenso Co., Ltd., Kariya; Toyota Jidosha Kogyo Kabushiki Kaisha, Toyota, both of Japan

[21] Appl. No.: 909,817

[22] Filed: May 26, 1978

[51] Int. Cl.² .................... F16J 15/36; F28D 19/00
[52] U.S. Cl. ..................................... 277/96; 277/88; 165/9
[58] Field of Search ................. 165/9; 277/81 R, 85, 277/106, 88–90, 102, 184, 152, 96 R, 96.1, 96.2, 113, 232, 182

[56] References Cited
U.S. PATENT DOCUMENTS

| 3,157,226 | 11/1964 | Atwood | 165/9 |
| 3,323,579 | 6/1967 | Brandt et al. | 165/9 X |
| 3,692,097 | 9/1972 | Penny | 165/9 |
| 3,939,903 | 2/1976 | Sakaki et al. | 277/96 R X |
| 4,098,323 | 7/1978 | Wiegard et al. | 165/9 |

Primary Examiner—Robert S. Ward, Jr.
Attorney, Agent, or Firm—Cushman, Darby & Cushman

[57] ABSTRACT

A seal device for a rotary heat-exchanger of a gas turbine is held in bearing contact with each end face of a regenerative rotor of the heat-exchanger to partition a low-pressure exhaust gas passage and a high-pressure air passage from one another and to seal therebetween. The regenerative rotor is rotated across the passages to effect the heat-exchanger between the low-pressure exhaust gas and the high-pressure air. The seal device comprises a bellows having one end thereof secured to a seal member rotatably supporting the regenerative rotor and the other end secured to a flange fast on the inner wall of the rotor housing, and a jacket substantially backing up the bellows to control the shape thereof.

7 Claims, 5 Drawing Figures

FIG. 1 PRIOR ART
FIG. 2 PRIOR ART
FIG. 3
FIG. 4
FIG. 5
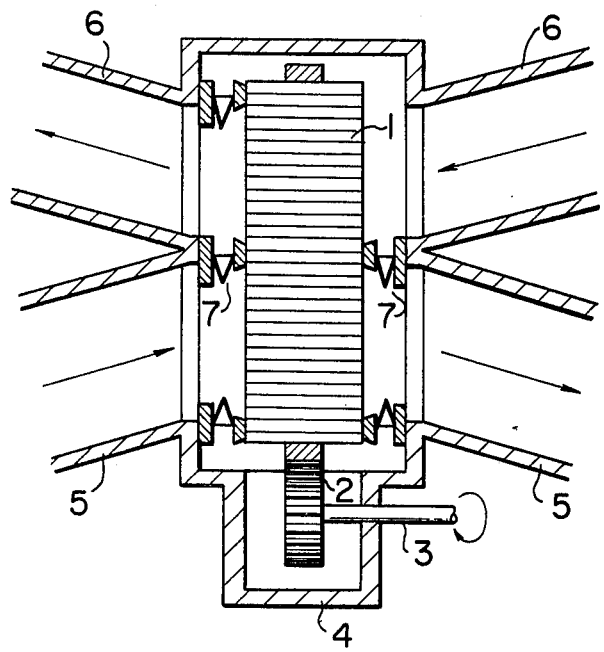
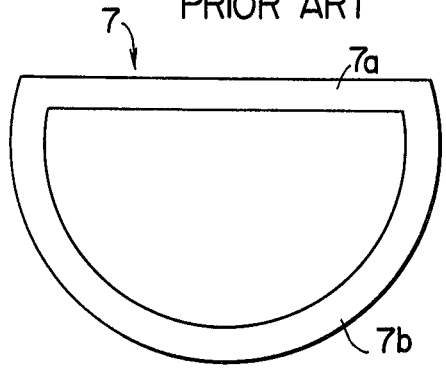
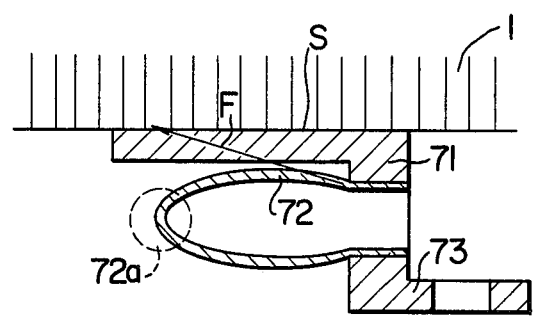
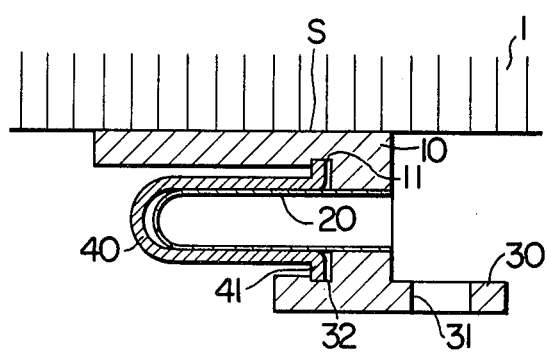
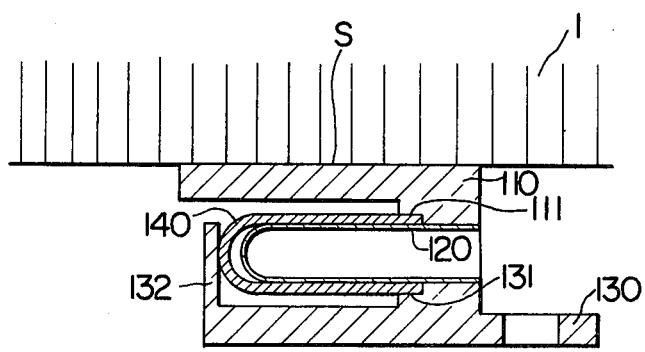

SEAL DEVICE FOR ROTARY HEAT-EXCHANGER

BACKGROUND OF THE INVENTION

Field of the Invention

This invention relates to improvements in a rotary heat-exchanger for use with a gas turbine, and more specifically to a seal device for such rotary heat-exchanger.

BRIEF DESCRIPTION OF DRAWINGS

FIG. 1 is a vertically sectional front view of a rotary heat-exchanger;

FIG. 2 is a schematic side view of a seal device shown in FIG. 1;

FIG. 3 is a sectional view of a seal device;

FIG. 4 is a sectional view of a first embodiment of the seal device according to the invention; and FIG. 5 is a sectional view of a second embodiment of the invention.

Before proceeding to the description of the present invention, the whole arrangement of the rotary heat-exchanger will be explained with reference to FIGS. 1 and 2, and a seal device devised by the present inventors in the course of approaching to a conclusion of the present invention will be described with reference to FIG. 3.

FIG. 1 shows a heat-exchanger which comprises a regenerative rotor 1 and a housing 4 therefor. The regenerative rotor 1 includes a matrix and is rotated across a low-pressure exhaust gas passage 5 and a high-pressure air passage 6, through a reduction gear 2, by a shaft 3 operatively connected to the drive shaft of a turbine, to perform the heat-exchange between the low-pressure exhaust gas and the high-pressure air.

For the rotary heat-exchanger, seal devices 7 held in sliding contact with the end faces of the rotor 1 within the housing 4 to provide leakproof sealing between the high-pressure air and low-pressure exhaust gas are essential component parts for the prevention of high-pressure air leakage and for improvement in performance.

Each of the seal devices 7 is generally "D"-shaped as in FIG. 2 (with the semicircular portion exposed to a low-pressure exhaust gas). In the course of approaching to a conclusion of the present invention, the inventors devised the seal device arranged as shown in FIG. 3. The seal device comprises a seal member 71 for rotatably supporting the regenerative rotor 1, a bellows 72 having one end thereof connected to the seal member 71 to force the latter against the end face of the rotor under the action of the pressure difference between the exhaust gas and air, and a flange 73 connected to the other end of the bellows 72.

However, the seal device shown in FIG. 3 has the following disadvantages. The pressure difference tends to bulge the bellows 72 sidewise to a circular form, and the straight portion 7a of the bellows (FIG. 2) is readily deformed. However, the semicircular portion 7b scarcely yields because its crest 72a, indicated in FIG. 3, offers considerable resistance to the bulging forces. As a result, the bellows cannot be freely deformed to a circular form, and the resulting force F acting on the seal member 71 will distort the sliding surface S of the member. This is particularly true in the corners where the straight portion 7a and the semicircular portion 7b of the seal meet. Moreover, forming the bellows 72 to a desired shape involves great difficulties, because it is subjected to disturbances due to the frictional force of the sliding surface S and variations in location of the regenerative rotor 1, thermal and chemical strains, errors in manufacture, and other factors. Consequently, the direction and magnitude of the force that applies to the seal member 71 are difficult to control.

SUMMARY OF THE INVENTION

It is an object of the present invention to provide a seal device for heat-exchangers, which comprises a shape-control jacket for controlling the shape of the bellows. The jacket has an adequate rigidity greater than that of the bellows and is divided into segments of a suitable size. The jacket backs up the bellows to keep the bellows to the desired shape and control the direction and magnitude of the force on the seal member.

Another object of the invention is to provide a seal device in which the jacket presents the bellows from being exposed to the hot, low-pressure exhaust gases, thereby to protect the bellows against the corrosive attacks.

In accordance with the invention, there is provided a seal device for a rotary heat-exchanger of a gas turbine, said seal device being in bearing contact with each end face of a regenerative rotor of said heat-exchanger to partition a low-pressure exhaust gas passage and a high-pressure air passage from one another and to seal therebetween, said regenerative rotor being rotated across said passages to effect the heat-exchange between the low-pressure exhaust gas and the high-pressure air, said seal device comprising a seal member for rotatably supporting the regenerative rotor, a bellows having one end thereof secured to the seal member to press the same against the end face of said rotor under the action of the pressure difference between the low-pressure exhaust gas and high-pressure air, a flange supporting the other end of said bellows, and a shape-control jacket disposed on the surface of said bellows which is exposed to the low-pressure exhaust gas, to control the shape of said bellows to a desired shape.

DETAILED DESCRIPTION OF PREFERRED EMBODIMENTS (FIGS. 4 and 5)

Referring now to FIG. 4 showing the first embodiment of the seal device of the invention, the seal device comprises a seal member 10 pressed slidably against one end face of a regenerative rotor 1 to provide a leakproof seal for both high-pressure air and low-pressure exhaust gas. The seal member 10 rotatably supports the rotor 1 at its sliding surface S. The seal member 10 has a straight seal portion and a semicircular portion integrally united to a letter "D" contour. The seal device further includes a bellows 20 made of a thin sheet of heat-resisting metal (e.g., SUH 310), welded at one end to the seal member 10 to urge the latter onto the regenerative rotor 1 by taking advantage of the pressure difference between the low-pressure exhaust gas and the high-pressure air. The bellows has also a straight and semicircular portions combined to a "D" shape. The other end of the bellows is welded to a flange 30 formed with bolt holes 31, through which bolts (not shown) will secure the entire seal device to a casing (not shown). A jacket 40 for confining and keeping or controlling the shape of the bellows 20 is put on the surface of the bellows 20 which is exposed to the low-pressure exhaust gas. This shape-control jacket 40 is made, for example, of a stainless steel spring with an adequately greater rigidity than the bellows 20, and is fixed in position with its hooks 41 at both ends fitted in grooves 11, 32 formed respectively, in the seal member 10 and the flange 30. The jacket 40 is given a spring action and divided into a plurality of segments, which are disposed embracingly on one side of the bellows 20 which is exposed to the low-pressure exhaust gas.

With the construction described, the seal device operates in the following manner.

As the regenerative rotor 1 is rotated to effect heat-exchange, the bellows 20 is subjected to the pressure difference between the high-pressure air and the low-pressure exhaust gas so that the bellows is urged against the seal member 10, flange 30, and shape-control jacket 40 to press the seal member 10 against the end face of the rotor 1 to provide a leakproof seal for the both high-pressure air and low-pressure exhaust gas.

During this stage of operation, the bellows 20 is in intimate contact with the inner wall surface of the shape-control jacket 40, with its faces in parallel with the sliding surface S. Thus, the major portion of the force which presses the seal member 10 slidably against the regenerative rotor 1 is applied perpendicularly with respect to the sliding surface S. The force applied in this direction reduces the distortion of the sliding surface, produces an adequate force for bearing contact, and ensures positive sealing.

Ordinarily, the bellows 20 is made of a material which can be embrittled by a chemical reaction with the carbon present in the low-pressure exhaust gases. With the seal according to the invention, however, the shape control jacket 40 covering the low-pressure exhaust side of the bellows provides little chance of chemical reaction. Hence the service life of the bellows 20 is extended.

As stated, since the shape-control jacket 40 in this embodiment is bent to keep the spring force, the jacket 40 has an initial urging force to press the surface S against the rotor 1.

The second embodiment shown in FIG. 5 will now be explained. Here the shape-control jacket 140 is secured in place in a modified way. The opposing faces of the seal member 110 and the flange 130 are stepped at 111 and 131, respectively. Both ends of the shape-control jacket 140 U-shaped in cross section are fitted on the steps 111 and 131, respectively. In addition, the crest of the jacket 140 is held securely by a yoke or stop 132 formed by bending the flange 130. In the same manner as in the previous embodiment, this jacket 140 is disposed on the low-pressure exhaust side of the bellows 120.

The embodiment of the construction described immediately above can achieve the same effect as the first embodiment.

While the shape-control jackets 40, 140 have been described as being previously deflected to provide therefor spring action, this is not an essential limitation to the present invention.

As has been described hereinbefore, it is possible, according to this invention, to obtain a positive sealing effect through the control of the magnitude and direction of the force on the seal member of the seal device, by disposing a shape-control jacket for constraining and embracing the low-pressure exhaust side of the bellows. Moreover, the bellows can be protected and its life is prolonged. Further, the jacket may serve also as a spring to provide initial urging for the seal member into sliding contact with the associated face of the rotor.

What is claimed is:

1. A seal device for a rotary heat-exchanger of a gas turbine, said seal device being in bearing contact with each end face of a regenerative rotor of said heat-exchanger to partition a low-pressure exhaust gas passage and a high-pressure air passage from one another and to seal therebetween, said regenerative rotor being rotated across said passage to effect the heat-exchange between the low-pressure exhaust gas and the high-pressure air, said seal device comprising a seal member for rotatably supporting the regenerative rotor, a bellows having one end thereof secured to the seal member to press the same against the end face of said rotor under the action of the pressure difference between the low-pressure exhaust gas and high-pressure air, a flange supporting the other end of said bellows, and a shape-control jacket disposed on the surface of said bellows to control the shape of said bellows to a desired shape.

2. A seal device according to claim 1, wherein said shape-control jacket has formed at opposing ends thereof hooks, said hooks being fitted in grooves formed respectively in said seal member and said flange so that the jacket is secured thereto.

3. A seal device according to claim 1, wherein each of said seal member and said flange is stepped and the opposing ends of said shape-control jacket are engaged with the stepped portions, said seal device further comprising a member for supporting said shape-control jacket to maintain the jacket in engagement with the stepped portions.

4. A seal device according to claim 1, or 3, wherein said shape-control jacket is made of a stainless steel spring with a greater rigidity than said bellows.

5. A seal device according to claim 1, or 3, wherein said shape-control jacket is previously resiliently deflected to force said seal member and said flange away from each other.

6. A seal device according to claim 2, wherein said shape-control jacket is made of a stainless steel spring with a greater rigidity than said bellows.

7. A seal device according to claim 2, wherein said shape-control jacket is previously resiliently deflected to force said seal member and said flange away from each other.

* * * * *